United States Patent
Kim et al.

(10) Patent No.: US 11,280,425 B2
(45) Date of Patent: Mar. 22, 2022

(54) FUEL TANK ISOLATION SOLENOID VALVE FOR VEHICLE

(71) Applicants: HYUNDAI MOTOR COMPANY, Seoul (KR); KIA MOTORS CORPORATION, Seoul (KR)

(72) Inventors: Tac Koon Kim, Seoul (KR); Bu Yeol Ryu, Hwaseong-si (KR); Hyun Do Jeon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/095,547

(22) Filed: Nov. 11, 2020

(65) Prior Publication Data

US 2022/0034419 A1 Feb. 3, 2022

(30) Foreign Application Priority Data

Aug. 3, 2020 (KR) .................. 10-2020-0096617

(51) Int. Cl.
*F16K 31/06* (2006.01)
*F16K 31/524* (2006.01)
*B60K 15/03* (2006.01)

(52) U.S. Cl.
CPC .......... *F16K 31/0655* (2013.01); *B60K 15/03* (2013.01); *B60K 2015/03256* (2013.01); *F16K 31/52408* (2013.01)

(58) Field of Classification Search
CPC ................ F16K 31/0655; B60K 15/03; B60K 2015/03256
See application file for complete search history.

(56) References Cited

U.S. PATENT DOCUMENTS

| | | | | |
|---|---|---|---|---|
| 5,599,003 | A * | 2/1997 | Seemann | H01F 7/124 251/129.2 |
| 2009/0242815 | A1* | 10/2009 | Chen | F16K 31/0655 251/129.21 |
| 2014/0042347 | A1* | 2/2014 | Williams | F02C 7/232 251/129.02 |
| 2017/0107953 | A1* | 4/2017 | Weldon | F16K 31/003 |
| 2019/0248353 | A1* | 8/2019 | Kratzer | B60T 15/02 |

* cited by examiner

*Primary Examiner* — Daphne M Barry
*Assistant Examiner* — Patrick C Williams
(74) *Attorney, Agent, or Firm* — Morgan, Lewis & Bockius LLP

(57) ABSTRACT

A fuel tank isolation solenoid valve for a vehicle is provided. The fuel tank isolation solenoid valve may include a first plunger configured to be vertically movable and a second plunger configured to move along a plunger rotation path such that the plunger is mechanically maintained in an opened position or a closed position while no power is applied to a coil.

9 Claims, 11 Drawing Sheets

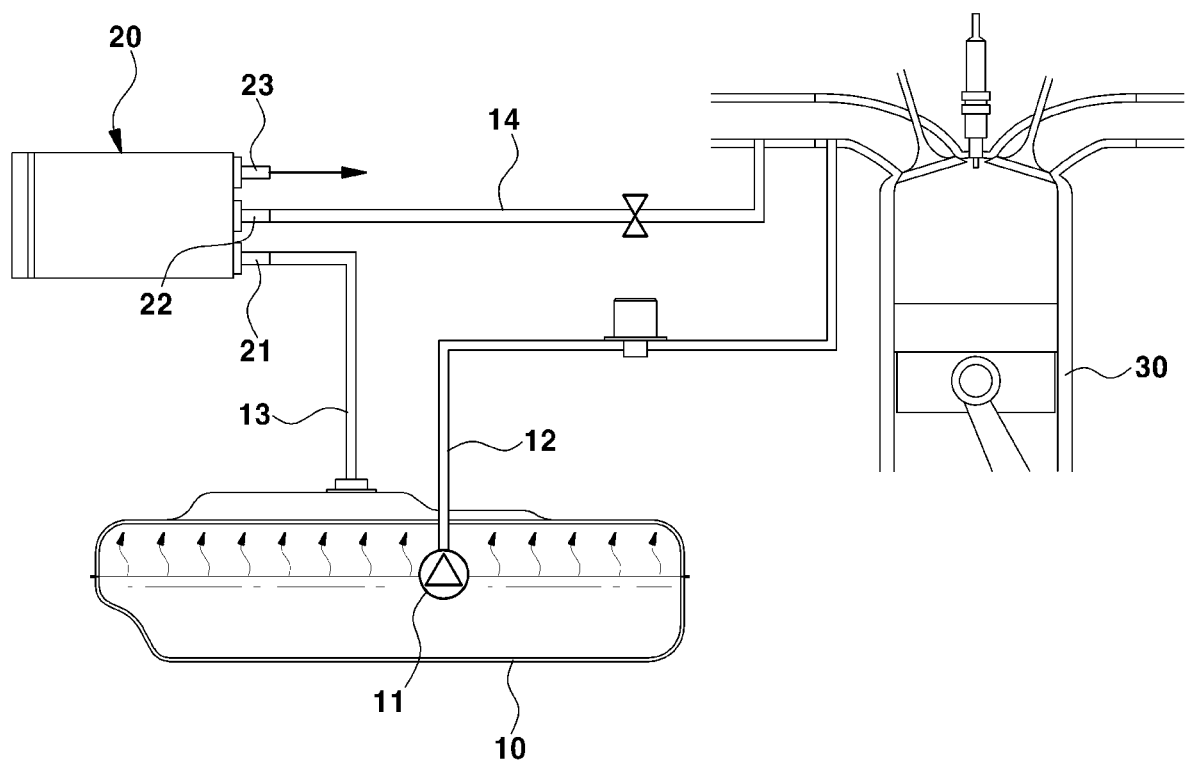
[FIG.1]

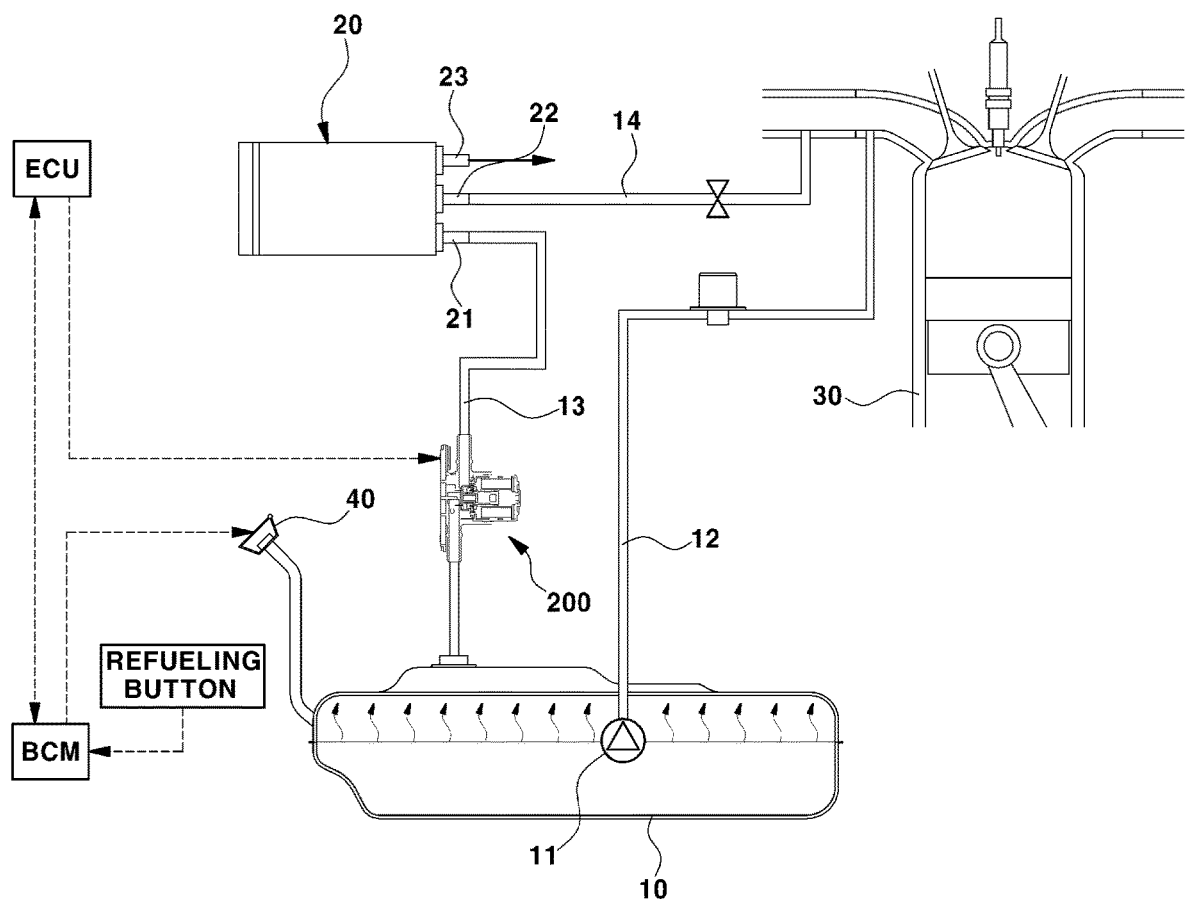
[FIG.2]

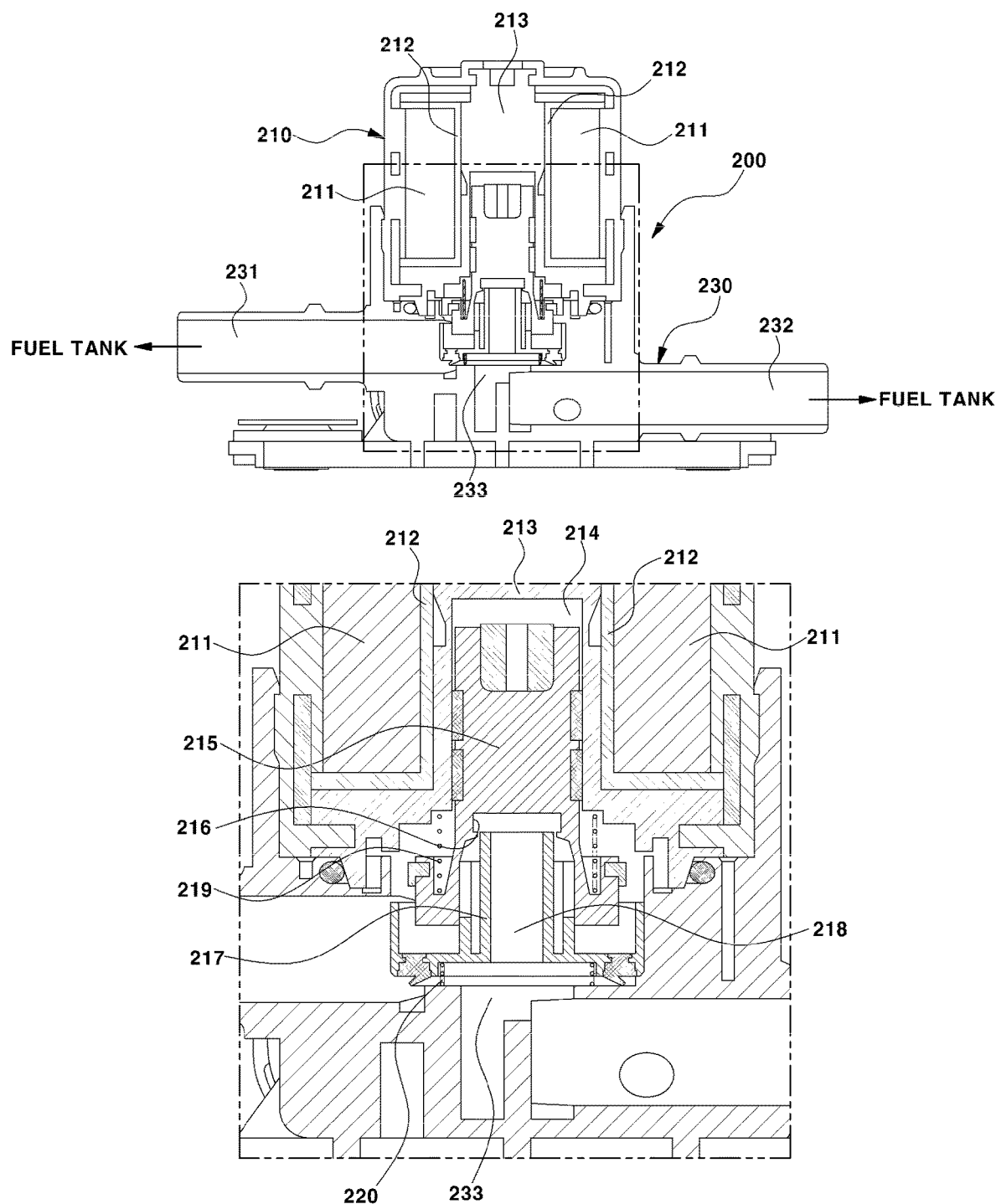
[FIG.3]

[FIG.4]
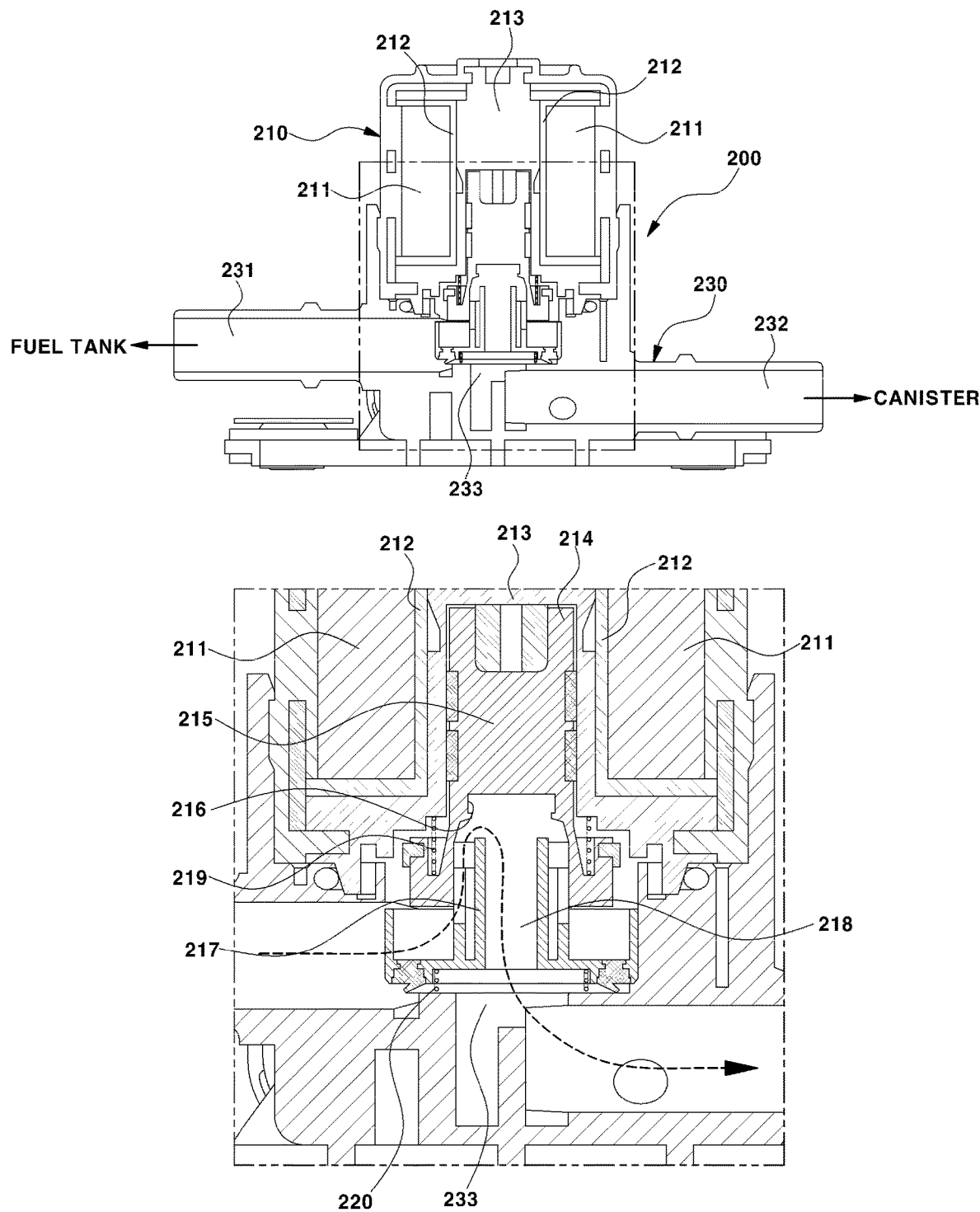

[FIG.5]
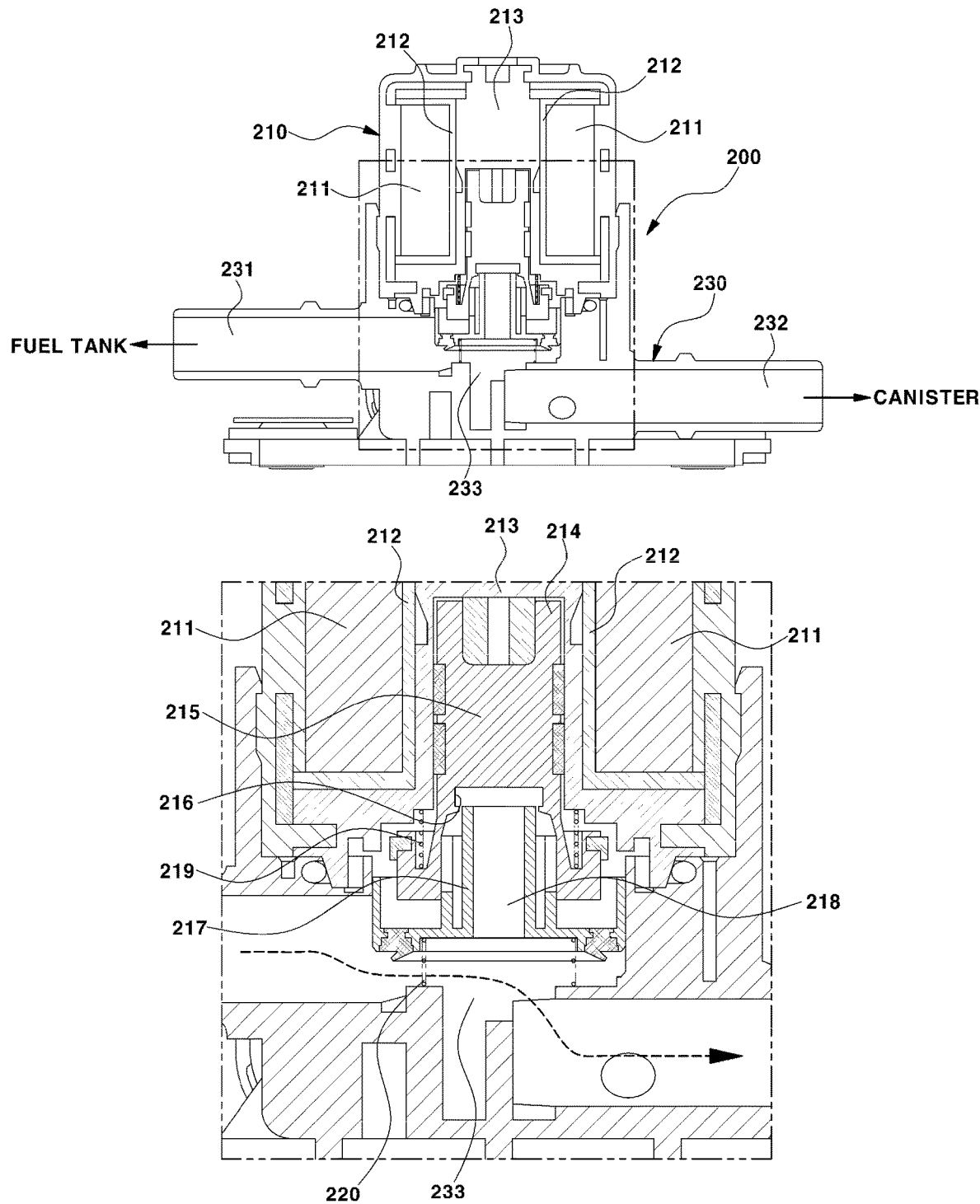

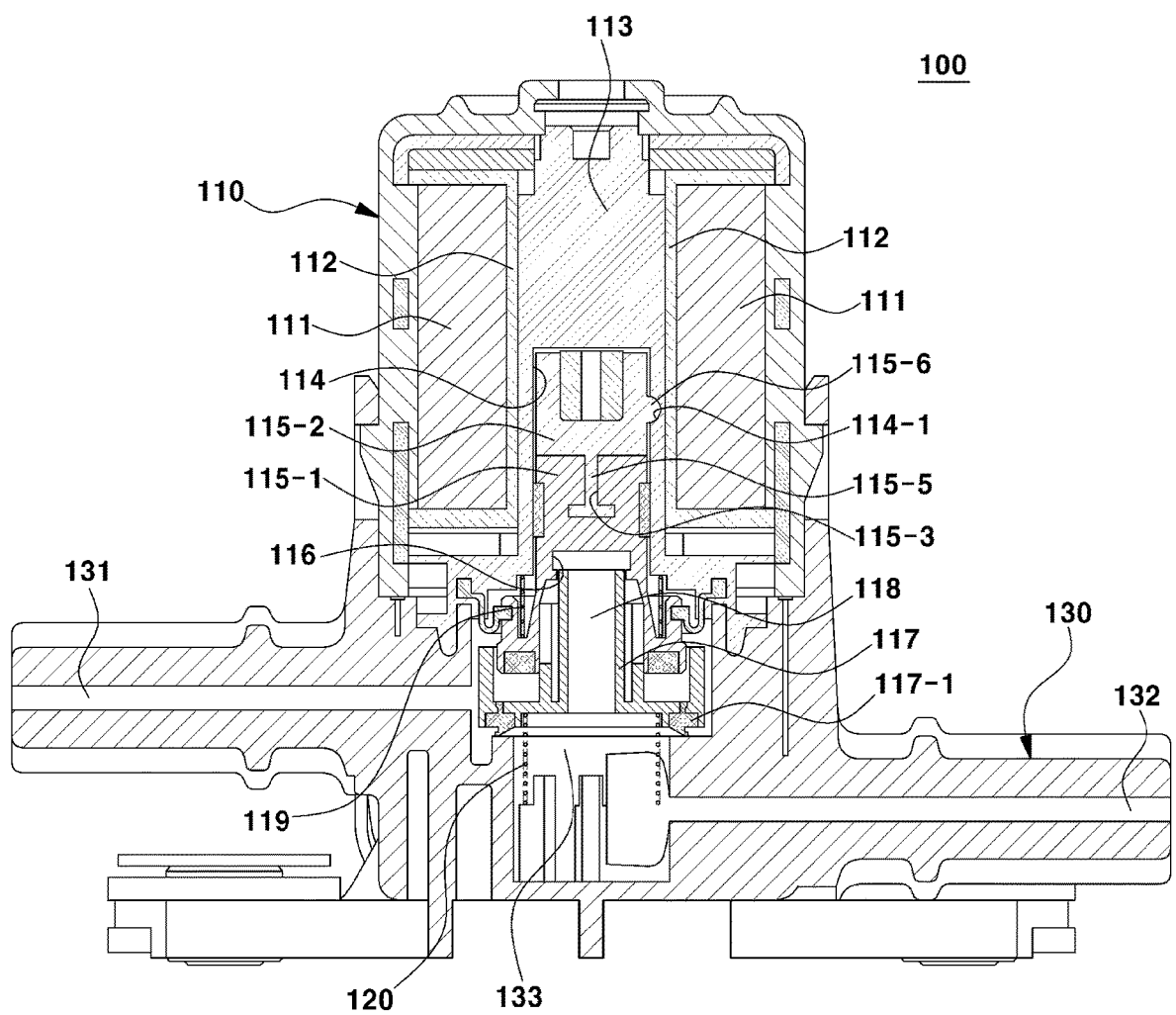
[FIG.6]

[FIG.7]
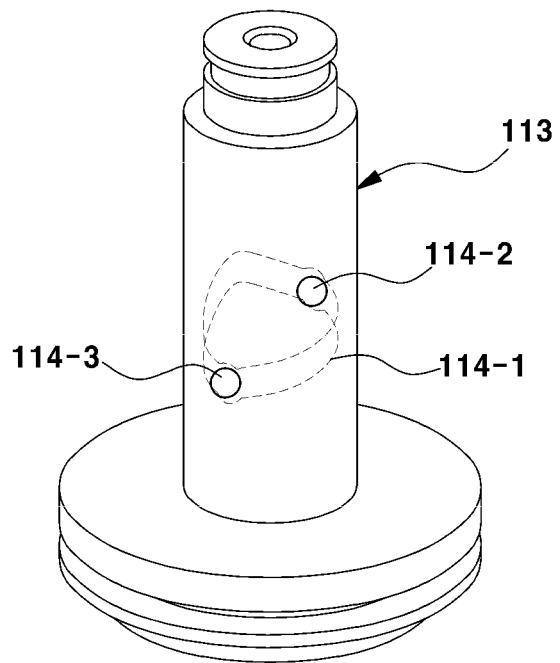
[FIG.8]
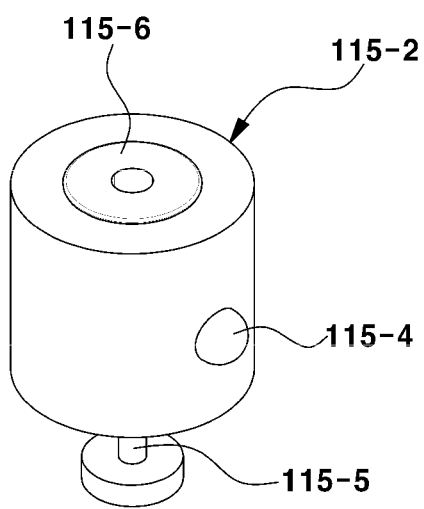

[FIG.9A]
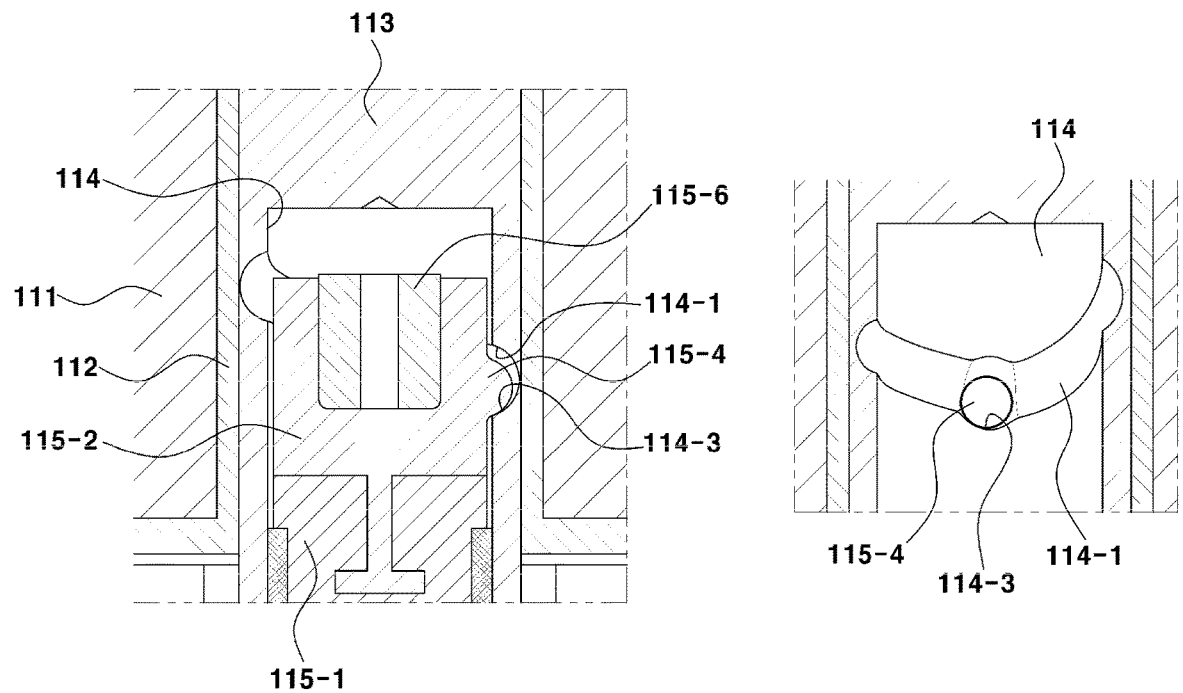
[FIG.9B]
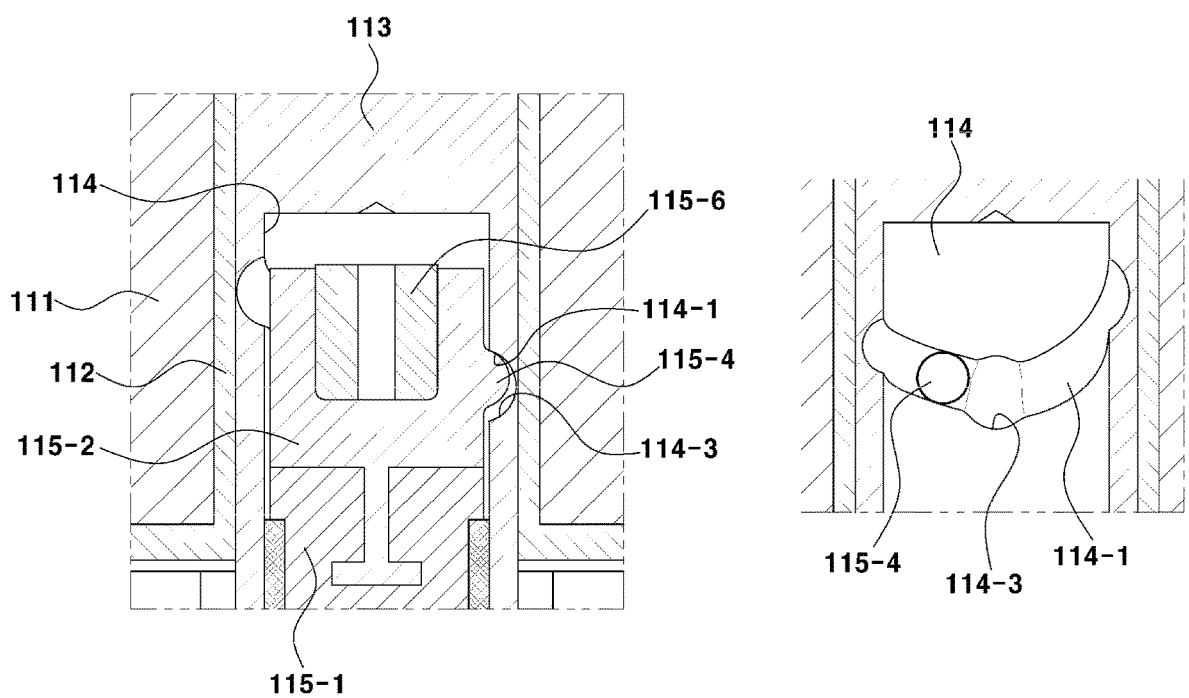

[FIG.9C]
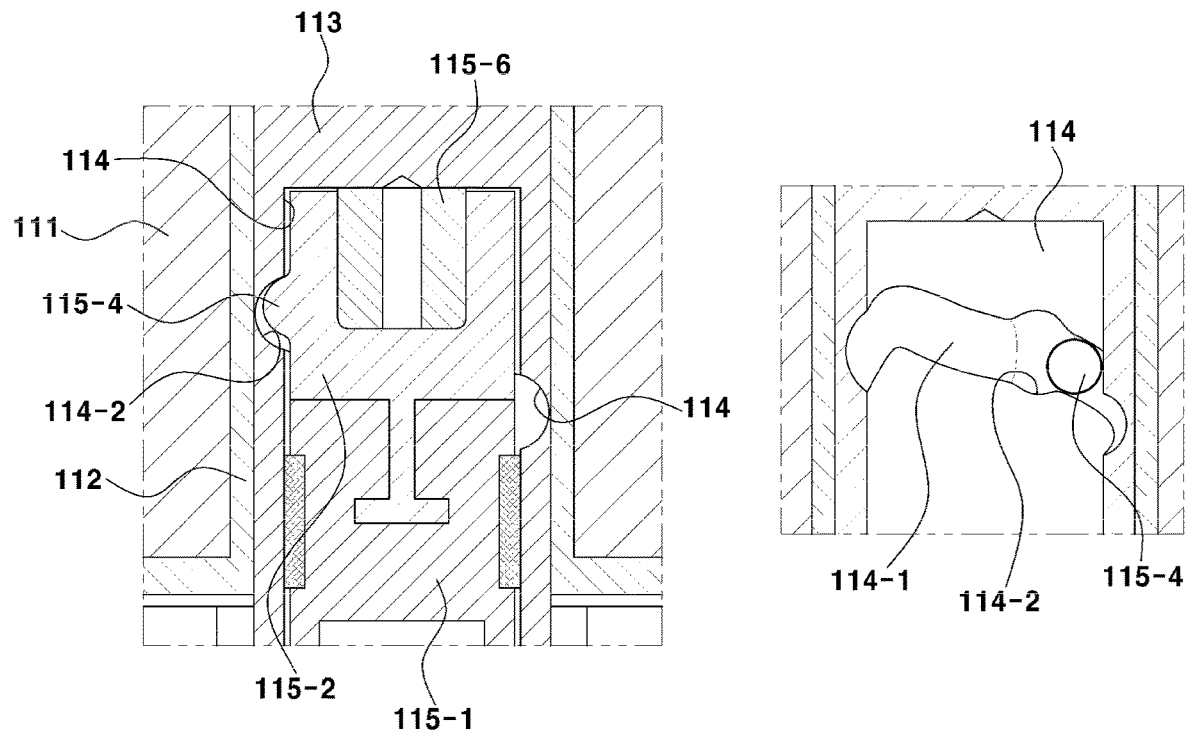
[FIG.9D]
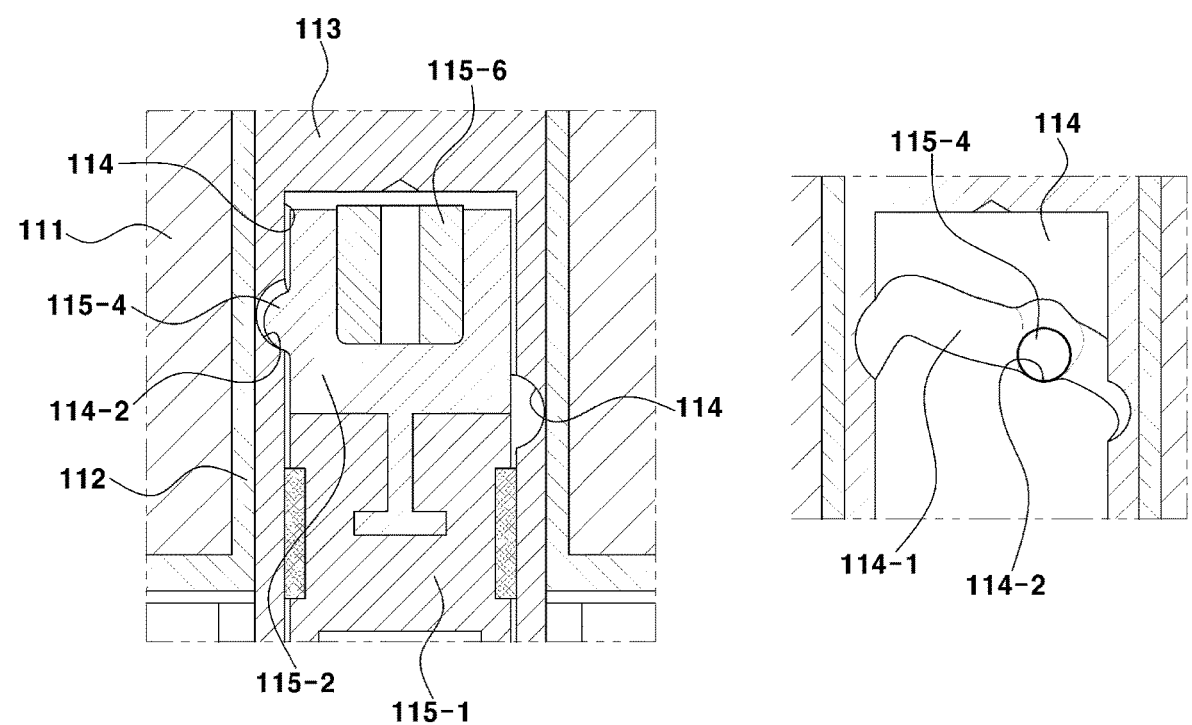

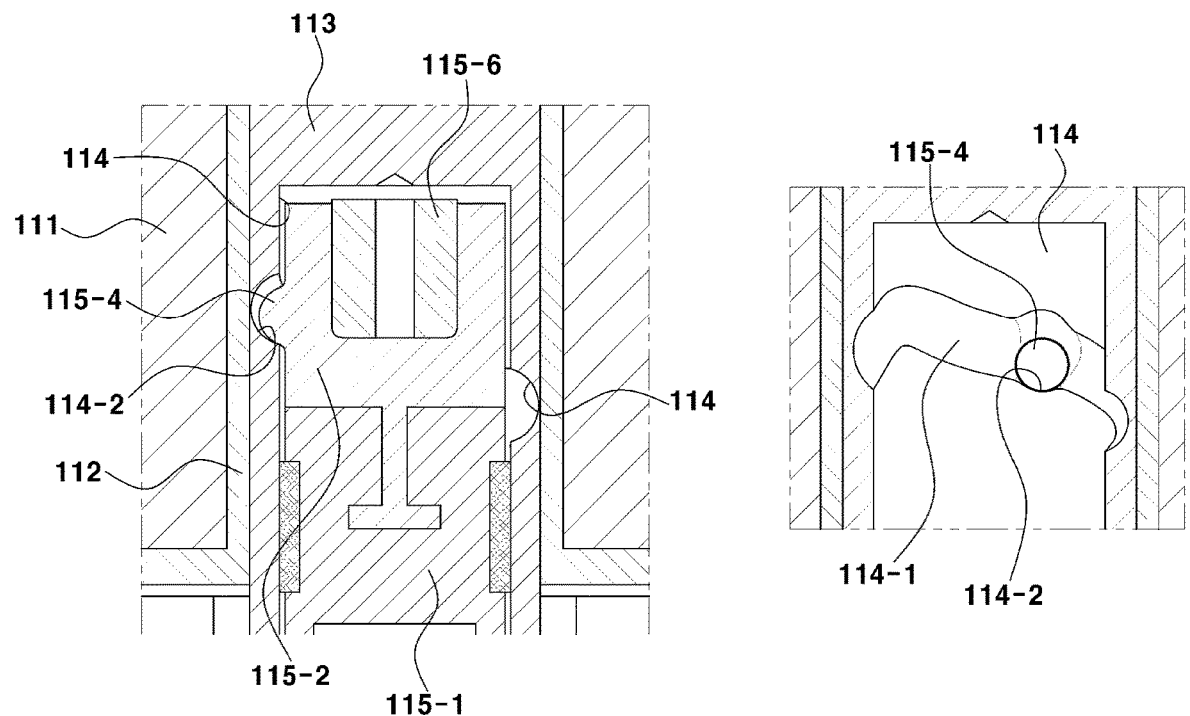
[FIG.10A]
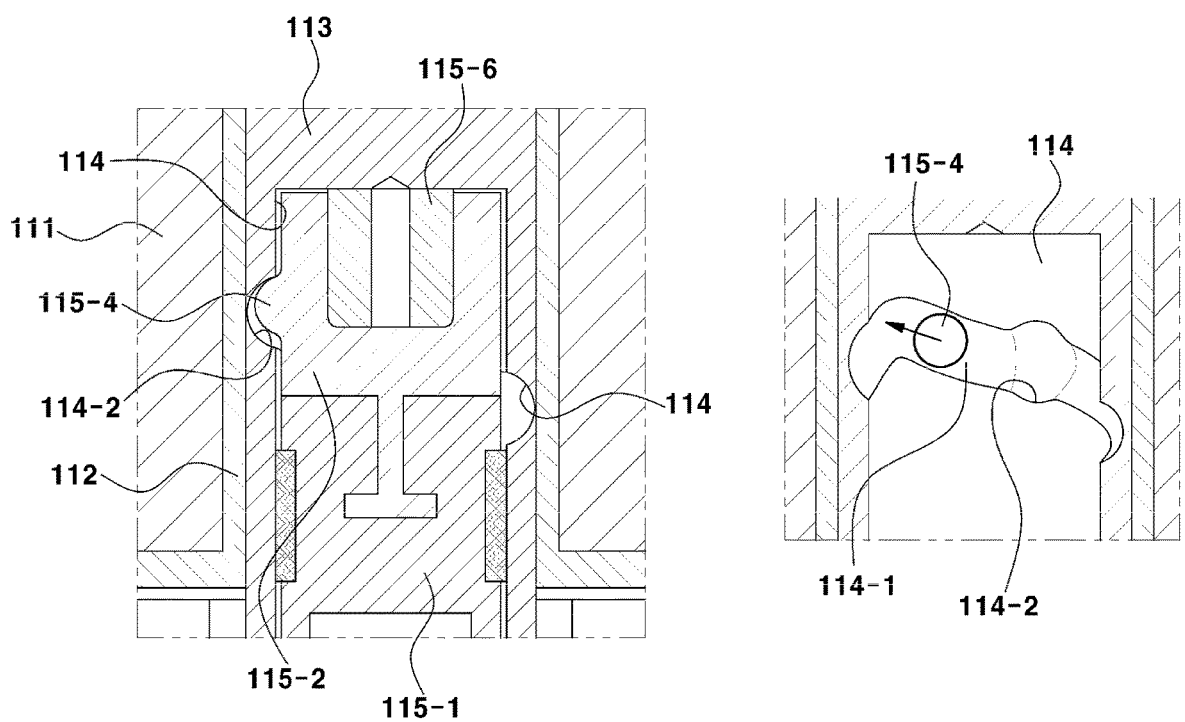
[FIG.10B]

[FIG.10C]
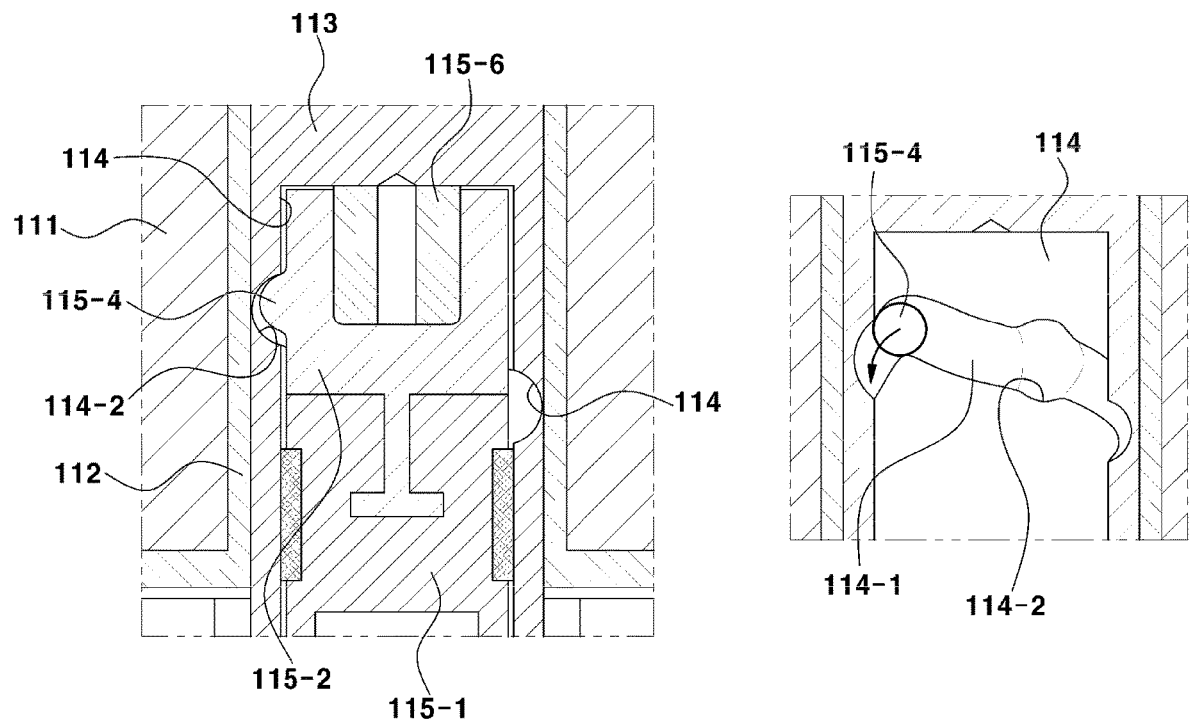
[FIG.10D]
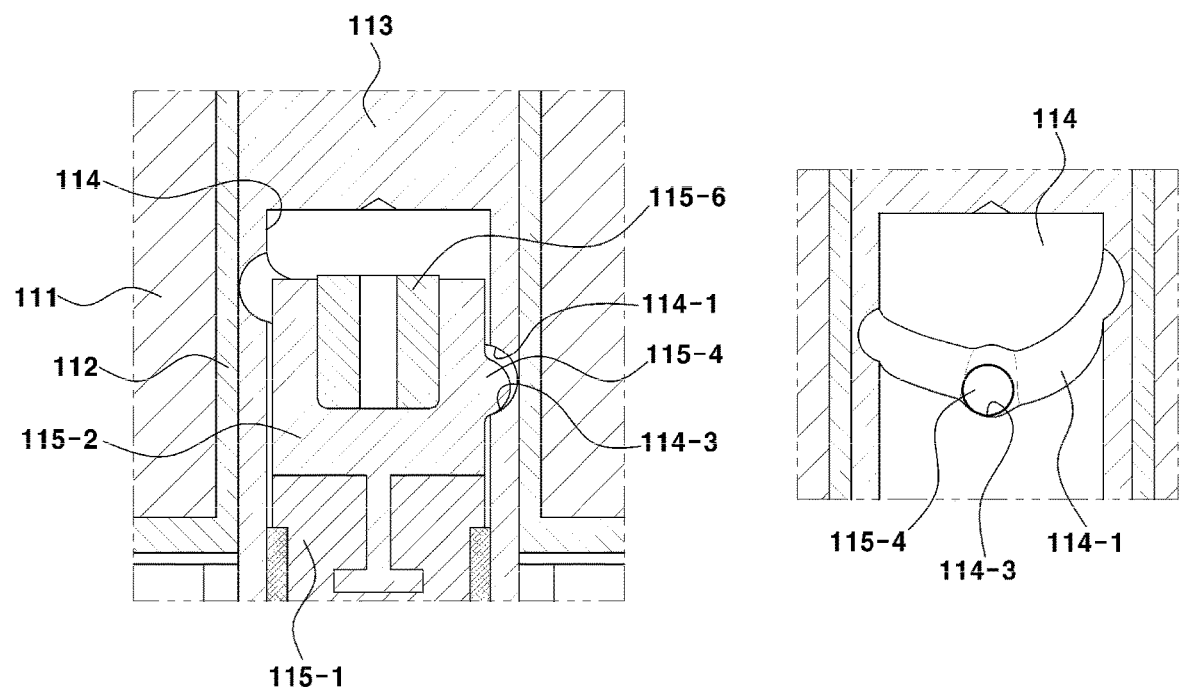

FUEL TANK ISOLATION SOLENOID VALVE FOR VEHICLE

CROSS-REFERENCE TO RELATED APPLICATION

The present application claims priority to and the benefit of Korean Patent Application No. 10-2020-0096617 filed on Aug. 3, 2020, the entire contents of which are incorporated herein by reference.

TECHNICAL FIELD

The present disclosure relates to a fuel tank isolation solenoid valve for a vehicle.

BACKGROUND

In a conventional isolation valve, because current is continuously supplied to the coil so as to maintain the isolation valve in the opened state when the isolation valve is opened by application of power to the coil, the battery may be electrically discharged.

In the conventional isolation valve, because the current is continuously supplied to the coil, functional deterioration may occur due to a heat generation.

Also, when an operation setting is established such that the application of current to the coil is released and the isolation valve is forcibly closed in order to reduce electrical discharge of the battery and occurrence of a fire after the limited opening time of the isolation valve passes, the internal pressure in the fuel tank may increase due to abrupt closing of the isolation valve during refueling, and the fuel may overflow from the fuel tank.

Furthermore, the plunger of the conventional isolation valve, which is intended to open and close the isolation valve, may not be stably maintained in the opened position and the closed position.

The above information disclosed in this Background section is only for enhancement of understanding of the background of the disclosure and therefore it may contain information that does not form the prior art that is already known in this country to a person of ordinary skill in the art.

SUMMARY

The present disclosure provides a fuel tank isolation solenoid valve for a vehicle, which adopts a plunger composed of a first plunger configured to be vertically movable and a second plunger configured to be moved along a plunger rotation path such that the plunger is mechanically maintained in an opened position or a closed position when no power is applied to a coil, thereby preventing the continuous supply of current to the coil and thus electrical discharge of a battery and thereby improving the performance and durability of the isolation solenoid valve by stably maintaining the plunger, a valve body and the like in the opened and closed positions thereof.

In one aspect, the present disclosure provides a fuel tank isolation solenoid valve for a vehicle including an upper case, a bobbin mounted in the upper case, around which a coil is wound, a core mounted in the bobbin, the core having a plunger passage which is open at a lower end thereof, a plunger rotation path formed in an inner surface of the plunger passage in the shape of a closed ring so as to have an upper holding groove and a lower holding groove, a second plunger including a holding protrusion, which is formed on a circumferential surface thereof so as to be raised and lowered along the plunger rotation path and to be received and held in the upper holding groove and the lower holding groove, a first plunger coupled to the second plunger such that the second plunger is disposed on the first plunger and is rotatable relative to the first plunger, the first plunger being vertically movably disposed in the plunger passage, a lower case assembled with the upper case, the lower case having a first passage communicating with a fuel tank, a second passage communicating with a canister and a communication passage formed between the first passage and the second passage, a valve body disposed under the first plunger and being vertically movable so as to open and close the communication passage, a first spring disposed between the lower surface of the core and the lower end of the first plunger, and a second spring disposed between the lower surface of the valve body and the communication passage.

In a preferred embodiment, the second plunger may include a rotating shaft projecting from a lower portion thereof, and the first plunger may include a coupling hole formed in the upper portion thereof, the rotating shaft of the second plunger being rotatably fitted into the coupling hole in the first plunger.

In another preferred embodiment, the plunger rotation path may be formed in an inner surface of an upper portion of the plunger passage in the core so as to define a heart-cam-shaped track and to have a predetermined depth.

In still another preferred embodiment, the upper holding groove may be formed at a highest point in the plunger rotation path so as to be concave downwards, and the lower holding groove may be formed at the lowest point in the plunger rotation path so as to be concave downwards.

In yet another preferred embodiment, the second plunger may be provided at an upper surface thereof with a stopper, which comes into contact with an upper end surface of the plunger passage formed in the core while absorbing shocks.

In still yet another preferred embodiment, when power is applied to the coil for an operation of opening the isolation solenoid valve, the first plunger may be raised and the holding protrusion of the second plunger may be raised along the plunger rotation path and may be positioned at an entrance of the upper holding groove.

In a further preferred embodiment, when the holding protrusion of the second plunger is positioned at the entrance of the upper holding groove, the application of power to the coil may be released and the holding protrusion may be received in the upper holding groove such that the isolation solenoid valve is maintained in an opened state while no power is applied to the coil.

In another further preferred embodiment, when power is temporarily applied to the coil for an operation of closing the isolation solenoid valve, the first plunger may be raised and the holding protrusion of the second plunger may escape from the upper holding groove and may enter the plunger rotation path.

In still another further preferred embodiment, when the holding protrusion of the second plunger enters the plunger rotation path from the upper holding groove, the application of power to the coil may be released, whereby the first plunger is lowered and the holding protrusion of the second plunger is lowered along the plunger rotation path and is received in the lower holding groove and held therein by the elastic restoring force of the first spring.

Other aspects and preferred embodiments of the disclosure are discussed infra.

The above and other features of the disclosure are discussed infra.

DRAWINGS

The above and other features of the present disclosure will now be described in detail with reference to certain exemplary embodiments thereof, illustrated in the accompanying drawings which are given hereinbelow by way of illustration only, and thus are not limitative of the present disclosure, and wherein:

FIG. 1 is a schematic view illustrating a procedure in which the evaporated gas in a fuel tank is collected in a canister and is then purged to an engine;

FIG. 2 is a schematic view illustrating a structure in which an isolation valve is provided between the fuel tank and the canister;

FIG. 3 is a cross-sectional view illustrating the structure of a conventional isolation valve and the closing operation thereof;

FIGS. 4 and 5 are cross-sectional views illustrating the structure of the conventional isolation valve and the opening operation thereof;

FIG. 6 is a cross-sectional view illustrating a fuel tank isolation solenoid valve for a vehicle in one form of the present disclosure;

FIG. 7 is a perspective view illustrating the track of the plunger rotation path formed in the core of the fuel tank isolation solenoid valve for a vehicle in one form of the present disclosure;

FIG. 8 is a perspective view illustrating the second plunger of the fuel tank isolation solenoid valve for a vehicle in one form of the present disclosure;

FIGS. 9A to 9D are enlarged cross-sectional views sequentially illustrating an opening operation of the fuel tank isolation solenoid valve for a vehicle in one form of the present disclosure; and FIGS. 10A to 10D are enlarged cross-sectional views sequentially illustrating a closing operation of the fuel tank isolation solenoid valve for a vehicle in one form of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, the reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments that may be included within the spirit and scope of the disclosure as defined by the appended claims.

Hereinafter, a preferred embodiment of the present disclosure will be described in detail with reference to the accompanying drawings.

Referring to FIG. 1, a fuel tank 10 for a vehicle is connected to a canister 20, which is configured to collect evaporated gas of fuel and to purge the evaporated gas to the combustion chamber in an engine 30 such that the evaporated gas is burned in the combustion chamber.

To this end, a discharge line 13 is disposed between the inlet 21 of the canister 20 and the fuel tank 10 and is connected thereto, and a purge line 14 is disposed between the outlet 22 of the canister 20 and an engine intake duct 31 and is connected thereto.

The canister 20 is provided therein with a collector (not shown), configured to adsorb and collect evaporated gas, and is provided with a discharge port 23 through which the remaining purified air excluding the evaporated gas collected at the collector is discharged to the outside.

Consequently, the fuel in the fuel tank 10 is supplied to the engine 30 through a fuel supply line 12 so as to be burned by operation of a fuel pump 11, and the evaporated gas from the fuel in the fuel tank 10 is collected in the canister 20 through the discharge line 13, and is supplied to the engine 30 through the purge line 14 so as to be burned due to the negative intake pressure of the engine.

Hybrid vehicles, particularly plug-in hybrid electric vehicles (PHEVs), travel in an EV traveling mode using a drive motor. However, when evaporated gas is maximally collected in the canister 20, there is a limitation on collection of the evaporated gas which is continuously introduced from the fuel tank 10.

Although the evaporated gas collected in the canister 20 is purged to the engine so as to be burned when the hybrid vehicle is converted into an HEV traveling mode in which the engine is operated, the evaporated gas is continuously introduced from the fuel tank 10 beyond the collection capacity of the canister 20 in a parked or stopped state or an EV traveling mode.

Accordingly, when the evaporated gas is continuously introduced into the canister 20 from the fuel tank 10 in the state in which the evaporated gas is maximally collected in the canister 20, the evaporated gas exceeding the collection capacity of the canister 20 is not collected in the canister but is discharged to the atmosphere through the discharge port 23, thereby causing a problem of air pollution.

In order to solve the above problems, an isolation solenoid valve 200 is mounted on the discharge line 13 connected both to the fuel tank 10 and to the inlet 21 of the canister 20 such that isolation valve 200 is closed or opened so as to block or permit flow of the evaporated gas to the canister 20 from the fuel tank 10, as illustrated in FIG. 2.

The isolation valve 200, which is a solenoid-type isolation valve configured to be opened upon application of power, is normally maintained in the closed state but is opened only when the engine is operated or the fuel tank is refueled.

More specifically, the isolation valve 200 is maintained in the closed state in a normal situation in which the engine is not operated, as in a parked or stopped state or an EV traveling mode. However, the isolation valve 200 is opened by application of power in response to a signal from a controller (for example, an engine control unit; ECU) upon operation of the engine or by application of power in response to a signal from a controller (for example, a body control module; BCM) upon refueling.

Consequently, when the isolation valve 200 is maintained in the closed state, the evaporated gas in the fuel tank 10 is hermetically stored in the fuel tank 10 without flowing into the canister 20, thereby preventing the evaporated gas from being discharged to the atmosphere through the canister 20.

Meanwhile, when the isolation valve 200 is opened upon operation of the engine, the evaporated gas in the fuel tank 10 is collected in the canister 20 through the opened isolation valve 200, and the evaporated gas collected in the canister 20 is purged to the engine so as to be burned due to the negative intake pressure of the engine.

In addition, when the isolation valve 200 is opened upon refueling of the fuel tank, the evaporated gas in the fuel tank 10 is collected in the canister 20 through the opened isolation valve 200, and the internal pressure in the fuel tank 10 is released, thereby allowing the fuel tank to be easily refueled.

At this time, when a refueling button in the vehicle is pushed by a user, the controller (for example, the body control unit; BCM) performs control to check whether the isolation valve 200 is opened for release of the internal pressure in the fuel tank and to open an electrical fuel door 40.

The construction and operation of the conventional isolation valve will now be described with reference to FIGS. 3 to 5.

The isolation valve 200 is composed of an upper case 210 and a lower case 230, which are coupled to each other so as to define the appearance of the valve 200.

The lower case 230 has formed therein a first passage 231 to communicate with the fuel tank and a second passage 232 to communicate with the canister. A communication passage 233 is defined in the boundary portion between the first passage 231 and the second passage 232 so as to be opened and closed by means of a valve body 217.

A hollow bobbin 212, around which a coil 211 is wound, is mounted on the inner wall of the upper case 210, and a core 213 is mounted in the bobbin 212.

The core 213 has formed therein a plunger passage 214, which is open at the lower end thereof, and a plunger 215 is vertically movably disposed in the plunger passage 214.

The plunger 215 has formed therein a valve passage 216, which is open at the lower end thereof. A valve body 217 is vertically movably disposed in the valve passage 216 so as to open and close the communication passage 233.

An evaporated gas passage 218 is vertically formed through the valve body 217 so as to allow the evaporated gas to pass therethrough.

Here, a first spring 219 is disposed between the lower surface of the core 213 and the lower end of the plunger 215, and a second spring 220 is disposed between the lower surface of the valve body 217 and the communication passage 233.

Closing Operation of the Isolation Valve

Referring to FIG. 3, when no power is applied to the coil 211, the plunger 215 is lowered while pushing the valve body 217 due to the elastic restoring force of the first spring 219 in a tensioning direction. Accordingly, since the valve body 217 closes the communication passage 233 while compressing the second spring 220, the isolation valve 200 is closed such that the evaporated gas in the fuel tank 10 cannot flow to the canister 20.

Consequently, since the isolation valve 200 is maintained in the closed state while the engine is not operated, as in a parked or stopped state or an EV traveling mode, the evaporated gas in the fuel tank 10 is hermetically stored in the fuel tank 10 without flowing to the canister 20, thereby preventing the evaporated gas from being discharged to the atmosphere through the canister 20.

Opening Operation of the Isolation Valve

Referring to FIG. 4, when power is applied to the coil 211, the plunger 215 is momentarily raised along the plunger passage 214 in the core 213 due to magnetic attraction, and thus a gap is formed between the plunger 215 and the valve body 217.

Consequently, the evaporated gas in the fuel tank sequentially flows through the first passage 231 in the lower case 230, the gap defined between the plunger 215 and the valve body 217, the evaporated gas passage in the valve body 217 and the second passage 232 in the lower case 230, and thus the evaporated gas is collected in the canister 20 connected to the second passage 232.

As illustrated in FIG. 5, the valve body 217 is subsequently raised along the valve passage 216 in the plunger 215 due to the elastic restoring force of the second spring 220 in a tensioning direction, and the communication passage 233 is thus opened. Consequently, the evaporated gas in the fuel tank 10 sequentially flows through the first passage 231, the communication passage 233 and the second passage 232 in the lower case 230, and is thus collected in the canister 20.

Consequently, when the engine of the hybrid vehicle is operated, the evaporated gas in the fuel tank 10 is collected in the canister 20 through the opened communication passage 200, and the evaporated gas collected in the canister 20 is purged to the engine so as to be burned due to the negative intake pressure of the engine.

In addition, when the fuel tank is refueled, the evaporated gas in the fuel tank 10 is collected in the canister 20 through the opened isolation valve 200, and the internal pressure in the fuel tank 10 is released, thereby allowing the fuel tank 10 to be easily refueled.

FIG. 6 illustrates a fuel tank isolation solenoid valve for a vehicle according to an embodiment of the present disclosure.

As illustrated in FIG. 6, the fuel tank isolation solenoid valve 100 according to the embodiment is composed of an upper case 110 and a lower case 130, which are coupled to each other so as to define the appearance of the valve 100.

The lower case 130 has formed therein a first passage 131 to communicate with a fuel tank and a second passage 132 to communicate with a canister. A communication passage 133 is defined in the boundary portion between the first passage 131 and the second passage 132 so as to be opened and closed by means of a valve body 117.

A hollow bobbin 112, around which a coil 111 is wound, is mounted on the inner wall of the upper case 110, and a core 113 is mounted in the bobbin 112.

The core 113 is provided therein with a plunger passage 114, which is open at the lower end thereof.

Particularly, the plunger passage 114 in the core 113 is provided in the inner surface thereof with a plunger rotation path 114-1, which is a closed circulation path and has therein an upper holding groove 114-2 and a lower holding groove 114-3.

More specifically, the plunger rotation path 114-1 is formed in an upper portion of the inner surface of the plunger passage 114 in the core 113 so as to have a closed heart-cam-shaped track and to have a predetermined depth, as specifically illustrated in FIG. 7.

The upper holding groove 114-2 is formed at the highest point in the plunger rotation path 114-1 so as to be concave downwards, and the lower holding groove 114-3 is formed at the lowest point in the plunger rotation path 114-1 so as to be recessed downwards.

According to the embodiment, a first plunger 115-1 and a second plunger 115-2 are vertically movably disposed in the plunger passage 114 in the core 113.

The first plunger 115-1 has a coupling hole 115-3 formed in an upper portion thereof, with which the second plunger 115-2 is rotatably coupled, and has a valve passage 116, which is formed in a lower portion thereof so as to be open at the lower end thereof.

As illustrated in FIG. 8, the second plunger 115-2 is provided on the circumferential surface thereof with a holding protrusion 115-4, which is moved upwards and downwards along the plunger rotation path 114-1 and is received and held in the upper holding groove 114-2 or the lower holding groove 114-3, and is provided at the lower end thereof with a rotating shaft 115-5 projecting from the lower end.

Accordingly, when the rotating shaft 115-5 of the second plunger 115-2 is rotatably fitted into the coupling hole 115-3 in the first plunger 115-1, the second plunger 115-2 is rotatably coupled to the first plunger 115-1 in the vertically stacked state.

Consequently, when the second plunger 115-2 is inserted into the plunger passage 114 in the state in which the second plunger 115-2 is rotatably coupled to the first plunger 115-1, the holding protrusion 115-4 of the second plunger 115-2 is disposed in the plunger rotation path 114-1 so as to be raised and lowered while rotating along the plunger rotation path 114-1, and the first plunger 115-1 is vertically movably disposed in the plunger passage 114.

The second plunger 115-2 is provided on the upper surface thereof with a stopper 115-6, which comes into contact with the upper surface of the plunger passage 114 formed in the core 114, thereby limiting vertical movement of the second plunger 115-2 and buffering the second plunger 115-2.

The valve body 117, which is intended to open and close the communication passage 133 in the lower case 130, is vertically movably disposed in the valve passage 116 formed in the first plunger 115-1.

The valve body 117 is constructed such that an evaporated gas passage 118 is vertically formed through the valve body 117 so as to allow evaporated gas to pass therethrough and a blocking plate 117-1 is integrally formed at the circumference of the lower end of the valve body 117 so as to close the communication passage 113.

Accordingly, when the blocking plate 117-1 of the valve body 117 closes the communication passage 133 while the valve body 117 comes into close contact with the upper end surface of the valve passage 116 and thus closes the evaporated gas passage 118, the first passage 131 and the second passage 132 in the lower case 130 are blocked with respect to each other, thereby preventing the evaporated gas in the fuel tank from flowing into the canister.

Here, a first spring 119 is disposed between the lower surface of the core 113 and the lower end of the first plunger 115-1, and a second spring 120 is disposed between the lower surface of the valve body 117 and the communication passage 133.

The operation of the fuel tank isolation solenoid valve according to the embodiment, which is constructed in the above-described manner, will now be described.

The isolation solenoid valve 100 is maintained in the closed position in the normal state, in which the engine is not operated, as in a parked or stopped state and an EV traveling mode. The isolation solenoid valve 100 is opened by supplying power in response to a signal from a controller (for example, an engine control unit; ECU) upon operation of the engine, or in response to a signal from a controller (for example, BCM) upon refueling.

While the isolation solenoid valve 100 is maintained in the closed position, the evaporated gas in the fuel tank 10 cannot flow to the canister 20 and is hermetically stored in the fuel tank 10, thereby preventing the evaporated gas from being discharged to the atmosphere through the canister 20.

Meanwhile, when the isolation solenoid valve 100 is opened upon operation of the engine, the evaporated gas in the fuel tank 10 is collected in the canister 20 through the opened isolation solenoid valve 200, and the evaporated gas collected in the canister 20 is purged to the engine due to the negative intake pressure of the engine so as to be burned.

In addition, when the isolation solenoid valve 100 is opened upon refueling of the fuel tank, the evaporated gas in the fuel tank 10 is collected in the canister 20 through the opened isolation solenoid valve 100, and the internal pressure in the fuel tank 10 is released, thereby allowing the fuel tank to be easily refueled.

Opening Operation of the Isolation Solenoid Valve

FIGS. 9A to 9D are enlarged cross-sectional views sequentially illustrating the operation of opening the fuel tank isolation solenoid valve for a vehicle according to the embodiment of the present disclosure.

When power is applied to the coil 111, the first plunger 115-1 is raised along the plunger passage 114 in the core 113 due to magnetic attraction while compressing the first spring, which is disposed between the lower surface of the core 112 and the lower end of the first plunger 115-1, and the second plunger 115-2 is raised along the plunger rotation path 114-1.

More specifically, when power is applied to the coil 111 in the state in which the holding protrusion 115-4 of the second plunger 115-2 is received in the lower holding groove 114-3 in the plunger rotation path 114-1, as illustrated in FIG. 9A, the first plunger 115-1 is raised while the holding protrusion 115-4 of the second plunger 115-2 escapes from the lower holding groove 114-3, as illustrated in FIG. 9B, and the holding protrusion 115-4 of the second plunger 115-2 is raised along the plunger rotation path 114-1 and is positioned at the entrance of the upper holding groove 114-2, as illustrated in FIG. 9C.

When the application of power to the coil 111 is released in the state in which the holding protrusion 115-4 of the second plunger 115-2 is positioned at the entrance of the upper holding groove 114-2, the holding protrusion 115-4 of the second plunger 115-2 is received and held in the upper holding groove 114-2 due to the elastic restoring force of the first spring 119, which acts on the first plunger 115-1 and the second plunger 115-2 in a tensioning direction. Therefore, the first plunger 115-1 and the second plunger 115-2 cannot be lowered any further, and the isolation solenoid valve 100 is maintained in the opened position. Consequently, it is possible to maintain the isolation solenoid valve 100 in the opened position while no power is applied thereto.

At this point, since the valve body 217 is raised along the valve passage 116 in the first plunger 115-1 and thus the communication passage 133 is opened due to the elastic restoring force of the second spring 120 in a tensioning direction, the evaporated gas in the fuel tank 10 sequentially passes through the first passage 131, the communication passage 133 and the second passage 132, and is then collected in the canister 20.

Consequently, when the engine of a hybrid vehicle is operated, the evaporated gas in the fuel tank 10 is collected in the canister 20 through the opened isolation solenoid valve 100, and the evaporated gas collected in the canister 20 is purged to the engine so as to be burned in the engine due to the negative intake pressure of the engine.

In addition, when the fuel tank 10 is refueled, the evaporated gas in the fuel tank 10 is collected in the canister 20 through the opened isolation solenoid valve 100, and the internal pressure in the fuel tank is released, thereby allowing the fuel tank 10 to be easily refueled.

Particularly, since the first and second plungers 115-1 and 115-2 are maintained in the opened position even when power is not applied to the coil 111, it is possible to maintain the isolation solenoid valve 100 in the opened state. Consequently, it is possible to prevent electrical discharge of the battery, which would otherwise occur when current is continuously supplied to the coil in the state in which the isolation solenoid valve is opened, and it is possible to prevent functional deterioration and risk of fire disaster attributable to heat generation in the isolation solenoid valve, caused by continuous supply of current to the coil.

Closing Operation of the Isolation Solenoid Valve

FIGS. 10A to 10D are enlarged cross-sectional views sequentially illustrating the closing operation of the fuel tank isolation solenoid valve for a vehicle according to the embodiment of the present disclosure.

In order to convert the isolation solenoid valve 100 into the closed state from the opened state, the holding protrusion 115-4 of the second plunger 115-2 must escape from the upper holding groove 114-2.

Specifically, because the holding protrusion 115-4 of the second plunger 115-2 is received in the upper holding groove 114-2 when the isolation solenoid valve 100 is opened, as illustrated in FIG. 10A, the holding protrusion 115-4 of the second plunger 115-2 must escape from the upper holding groove 114-2 in order to convert the isolation solenoid valve 100 into the closed state from the opened state, as illustrated in FIG. 10B.

When power is temporarily applied to the coil 111 in order to close the isolation solenoid valve 100, the first plunger 115-1 is raised, and the holding protrusion 115-4 of the second plunger 115-2 escapes from the upper holding groove 114-2 and enters the plunger rotation path 114-1, as illustrated in FIG. 10B.

Subsequently, the application of power to the coil 111 is interrupted at the moment the holding protrusion 115-4 of the second plunger 115-2 passes over the highest point in the plunger rotation passage 114-1, as illustrated in FIG. 10C.

Consequently, the holding protrusion 115-4 of the second plunger 115-2 is lowered along the plunger rotation path 114-1, and is received in the lower holding groove 114-3 due to the elastic restoring force of the first spring 119, which acts on the first plunger 115-1 and the second plunger 115-2 in the tensioning direction, thereby holding the first plunger 115-1 and the second plunger 115-2 in the closed position, as illustrated in FIG. 10D.

Accordingly, since the isolation solenoid valve 100 is maintained in the closed position in the normal state, in which the engine is not operated, as in a parked or stopped state and an EV traveling mode, the evaporated gas in the fuel tank 10 cannot flow to the canister 20, and is hermetically stored in the fuel tank 10, thereby making it possible to prevent the evaporated gas from being discharged to the atmosphere through the canister 20.

By virtue of the above-described construction, the present disclosure offers the following effects.

First, since the plunger can be mechanically maintained in the opened and closed positions while power is not applied to the coil, it is possible to maintain the isolation solenoid valve in the opened state while application of current to the coil is interrupted, and thus it is possible to prevent electrical discharge of the battery attributable to continuous supply of current to the coil while the isolation solenoid valve is in the opened state.

Second, since the holding protrusion of the second plunger is stably received and held in the upper or lower holding groove in the plunger rotation path, it is possible to maintain the plungers, the valve body and the like in the opened and closed positions without displacement, thereby improving the performance and durability of the isolation solenoid valve.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A fuel tank isolation solenoid valve for a vehicle comprising:
   an upper case;
   a bobbin mounted in the upper case, the bobbin being wound around with a coil;
   a core mounted in the bobbin, the core having a plunger passage which is open at a lower end of the plunger passage;
   a plunger rotation path formed in an inner surface of the plunger passage in a shape of a closed ring to have an upper holding groove and a lower holding groove;
   a second plunger including a holding protrusion, which is formed on a circumferential surface of the second plunger to be raised and lowered along the plunger rotation path and to be received and held in the upper holding groove and the lower holding groove;
   a first plunger coupled to the second plunger such that the second plunger is disposed on the first plunger and is rotatable relative to the first plunger, the first plunger being vertically movable and being disposed in the plunger passage;
   a lower case assembled with the upper case, the lower case further comprising:
      a first passage communicating with a fuel tank;
      a second passage communicating with a canister; and
      a communication passage formed between the first passage and the second passage;
   a valve body disposed under the first plunger and being vertically movable to open and close the communication passage;
   a first spring disposed between a lower surface of the core and a lower end of the first plunger; and
   a second spring disposed between a lower surface of the valve body and the communication passage.

2. The fuel tank isolation solenoid valve of claim 1, wherein:
   the second plunger includes a rotating shaft projecting from a lower portion of the second plunger,
   the first plunger includes a coupling hole formed in an upper portion of the first plunger, and
   the rotating shaft of the second plunger is rotatably fitted into the coupling hole in the first plunger.

3. The fuel tank isolation solenoid valve of claim 1, wherein the plunger rotation path is formed in an inner surface of an upper portion of the plunger passage in the core, and the plunger rotation path is configured to define a heart-cam-shaped track and to have a predetermined depth.

4. The fuel tank isolation solenoid valve of claim 1, wherein:

the upper holding groove is formed at a highest point in the plunger rotation path to be concave downwards, and the lower holding groove is formed at a lowest point in the plunger rotation path to be concave downwards.

5. The fuel tank isolation solenoid valve of claim 1, wherein:

the second plunger is provided at an upper surface of the second plunger with a stopper, and the stopper is configured to contact with an upper end surface of the plunger passage formed in the core while absorbing shocks.

6. The fuel tank isolation solenoid valve of claim 1, wherein, when power is applied to the coil for an opening operation of the isolation solenoid valve, the first plunger is raised and the holding protrusion of the second plunger is raised along the plunger rotation path, wherein the holding protrusion of the second plunger is positioned at an entrance of the upper holding groove.

7. The fuel tank isolation solenoid valve of claim 6, wherein, when the holding protrusion of the second plunger is positioned at the entrance of the upper holding groove, application of power to the coil is released and the holding protrusion of the second plunger is received in the upper holding groove such that the isolation solenoid valve is maintained in an opened state while no power is applied to the coil.

8. The fuel tank isolation solenoid valve of claim 1, wherein, when power is temporarily applied to the coil for a closing operation of the isolation solenoid valve, the first plunger is raised and the holding protrusion of the second plunger exits from the upper holding groove and enters the plunger rotation path.

9. The fuel tank isolation solenoid valve of claim 8, wherein, when the holding protrusion of the second plunger enters the plunger rotation path from the upper holding groove, application of power to the coil is released, wherein the first plunger is lowered and the holding protrusion of the second plunger is lowered along the plunger rotation path and the holding protrusion of the second plunger is held in the lower holding groove due to elastic restoring force of the first spring.

* * * * *